(12) United States Patent
Kang

(10) Patent No.: US 7,438,421 B2
(45) Date of Patent: Oct. 21, 2008

(54) TWO-PANEL TYPE PROJECTION SYSTEM AND PROJECTION METHOD THEREOF

(75) Inventor: Ki-hyung Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 11/119,847

(22) Filed: May 3, 2005

(65) Prior Publication Data

US 2005/0254022 A1 Nov. 17, 2005

(30) Foreign Application Priority Data

May 14, 2004 (KR) ...................... 10-2004-0034284

(51) Int. Cl.
*G03B 21/14* (2006.01)
(52) U.S. Cl. .............................. 353/31; 353/20; 353/84; 348/743; 349/8
(58) Field of Classification Search ...................... 353/7, 353/8, 20, 31, 34, 37, 84; 349/8, 9, 15; 348/742, 348/743; 359/634
See application file for complete search history.

(56) References Cited

U.S. PATENT DOCUMENTS

| | | | | |
|---|---|---|---|---|
| 5,534,949 | A * | 7/1996 | Baron | 348/742 |
| 6,388,718 | B1 | 5/2002 | Yoo et al. | |
| 6,650,377 | B2 * | 11/2003 | Robinson et al. | 349/9 |
| 6,666,556 | B2 * | 12/2003 | Hansen et al. | 353/20 |
| 6,712,472 | B2 * | 3/2004 | Florence | 353/20 |
| 6,961,181 | B2 * | 11/2005 | Chen et al. | 359/498 |
| 6,962,414 | B2 * | 11/2005 | Roth | 353/20 |
| 6,995,738 | B2 * | 2/2006 | Florence | 345/88 |
| 7,008,064 | B2 * | 3/2006 | McDonald | 353/84 |
| 7,083,282 | B1 * | 8/2006 | Sharp et al. | 353/20 |
| 2005/0206846 | A1 * | 9/2005 | Yeung et al. | 353/20 |
| 2006/0119797 | A1 * | 6/2006 | Ockenfuss | 353/31 |

FOREIGN PATENT DOCUMENTS

| | | |
|---|---|---|
| JP | 11-264953 | 9/1999 |
| JP | 2002-040367 | 2/2002 |
| KR | 2003-0062763 A | 7/2003 |
| KR | 2003-0090044 A | 11/2003 |

* cited by examiner

*Primary Examiner*—William C Dowling
(74) *Attorney, Agent, or Firm*—Stanzione & Kim, LLP

(57) ABSTRACT

A two-panel type projection system includes a polarization light source to irradiate a polarized white light, a color selector to sequentially transmit two light components every predetermined time among a plurality of light components having different wavelengths of the white light, a color path separator to separate and output paths of the two light components outputted from the color selector, a first modulating and outputting unit to receive a first light component among the two light components outputted from the color path separator to modulate and output the received first light component depending on its corresponding image signal, a second modulating and outputting unit to receive a second light component among the two light components outputted from the color path selector to modulate the received second light component depending on its corresponding image signal and output the modulated second light component in parallel with the first light component, and a projection lens to magnify and project the light components outputted from the first modulating and outputting unit and the second modulating and outputting unit.

16 Claims, 1 Drawing Sheet

TWO-PANEL TYPE PROJECTION SYSTEM AND PROJECTION METHOD THEREOF

CROSS-REFERENCE TO RELATED APPLICATIONS

This application claims the priority of Korean Patent Application No. 10-2004-34284, filed on May 14, 2004, in the Korean Intellectual Property Office, the disclosure of which is incorporated herein in its entirety by reference.

BACKGROUND OF THE INVENTION

1. Field of the Invention

The present general inventive concept relates to a two-panel type projection system and a projection method thereof, and more particularly, to a two-panel type projection system adapted to express a high brightness picture, and a projection method thereof.

2. Description of the Related Art

Recently, demands on a large screen display are increased due to a normalization of High Definition (HD) broadcasting using a satellite and a ground wave and a popularization of a home theater using a DVD player. Since a projection television replaces a conventional Cathode Ray Tube (CRT) television due to its advantage of manufacturing the large screen display at lowered manufacturing costs, a projector providing the larger screen display than the projection television is being increasingly demanded.

A projection system is a main component of the projection television or the projector. A three-panel type projection system has been used with three-panels respectively corresponding to Red/Green/Blue light components of a white light. However, the three-panel type projection system has a disadvantage of high manufacturing costs. Accordingly, a single panel type projection system has been developed to have a single panel to modulate all three light components, thereby reducing the manufacturing costs.

The single panel type projection system is advantageous of the manufacturing costs compared to the three-panel type projection system. However, the single panel type projection system has a drawback in that since the Red/Green/Blue light components are sequentially sent to one panel, the single panel type projection system has at most ⅓ of a light efficiency of the three-panel type projection system, thereby reducing a brightness, and in that a lamp is required to have a large capacity as a light source to generate light having the same brightness as the three-panel type projection system, thereby decreasing a life span of the lamp according to an increased capacity of the lamp.

Accordingly, a conventional two-panel type projection system of FIG. 2 is popularized due to its lowered manufacturing costs compared to the three-panel type projection system, and its high light efficiency compared to the single panel type projection system.

FIG. 2 is a view illustrating a schematic construction of a conventional two-panel type projection system.

As shown in FIG. 2, the two-panel type projection system includes a polarization light source 30, a color selector 32, a polarization conversion device 34, a polarization beam splitter 36, a first panel 38, a second panel 40, and a projection lens 28.

The polarization light source 30 outputs a single polarization component of a white light, and generally outputs an S-polarized light beam. The polarization light source 30 includes a lamp for irradiating a high-brightness white light, a Fly Eye Lens (FEL) for receiving the irradiated light to convert the received light into a parallel light, and a polarization conversion unit for receiving the parallel light from the FEL to convert the received parallel light into a specific polarization component.

The color selector 32 continuously transmits one of Red/Green/Blue light components, and alternatively transmits remaining two light components. For example, the color selector 32 repeats to transmit Red and Green light components (R+G) for a first time duration, and transmit Red and Blue light components (R+B) for a second time duration. The color selector 32 can be a rotatable dichroic wheel. The light component continuously transmitting the color selector 32 is differently determined depending on the lamp used in the polarization light source 30. For example, an Ultra-High Pressure (UHP) hydrargyrum lamp needs to supply more Green or Blue light component than Red light component to provide the white balance, due to an insufficient light amount of the Red light component, compared to the Green and Blue light components. In this case, the color selector 32 is configured to allow the Red light component outputted from the polarization light source 30 to continuously transmit the light to the color selector 32.

The polarization conversion device 34 converts the polarization of a specific light component. Here, an S-polarization of the Red light component is converted into a P-polarization.

The polarization beam splitter 36 has an interface having a coated dichroic film to transmit one polarization light component and reflect another polarization light component. Generally, the S-polarized light component is reflected and the P-polarized light component is transmitted. In this case, the P-polarized Red light component using the polarization conversion device 34 is incident on the second panel 40, and the S-polarized Green and Blue light components are sequentially incident on the first panel 38.

If the Green light component and the Blue light component are sequentially incident, the first panel 38 is driven by a signal unit (not shown) to sequentially modulate and reflect the Green light component and modulate and reflect the Blue light component. At this time, the polarizations of the reflected light components are converted into opposite polarizations of the incident light components. In this example, the S-polarization of the Green and Blue light components is converted into the P-polarization.

If the Red light component is incident, the second panel 40 is driven by the signal unit (not shown) to modulate and reflect the Red light component. At this time, the polarization of the reflected light component is converted into the opposite polarization of the incident light component. In this example, the P-polarization of the Red light component is converted into the S-polarization.

The P-polarized Green and Blue light components are transmitted through the coated interface of the polarization beam splitter 36 to be incident on the projection lens 28. The S-polarized Red light component is reflected from the coated interface of the polarization beam splitter 36 to be incident on the projection lens 28. The projection lens 28 magnifies and projects the incident Red/Green/Blue light components to produce a color image.

For example, the conventional two-panel type projection system has a dedicate panel for one color, which is selected depending on a lamp property, to continuously express one color, and the other panel to express remaining two colors in a time division way. In this case, a color temperature can be controlled according to a time division ratio of two colors expressed in the time division way. In this example, the color temperature is controlled using a time division ratio of the Green and Blue light components.

Since the conventional two-panel type projection system continuously expresses one color by using the dedicate panel, a time ratio of the remaining two colors expressed using the other panel should be varied to change the color temperature. Accordingly, the conventional two-panel type projection system has a drawback in that the color distribution is not free. Further, the conventional two-panel type projection system has a drawback in that the brightness is totally lowered since the brightnesses of the remaining colors should be lowered adaptively to the color having the lowest brightness so as to maintain the white balance at the time of controlling the color temperature.

SUMMARY OF THE INVENTION

The present invention provides a two-panel type projection system and a projection method thereof in which one dedicate panel is used for expressing one color, thereby achieving a free color distribution.

Also, the present invention provides a two-panel type projection system and a projection method thereof in which due to a free distribution of three colors, brightnesses of remaining colors are not lowered adaptively to a lowest-brightness color so as to maintain a white balance, thereby achieving a high brightness color.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a two-panel type projection system including a polarization light source to irradiate a polarized white light having a plurality of light components having different wavelengths, a color selector to sequentially transmit two light components of the polarized white light every predetermined time among the plurality of light components, a color path separator to separate and output paths of the two light components outputted from the color selector, a first modulating and outputting unit to receive a first light component among the two light components outputted from the color path separator to modulate and output the received first light component depending on its corresponding image signal, a second modulating and outputting unit to receive a second light component among the two light components outputted from the color path selector to modulate the received second light component depending on its corresponding image signal and output the modulated second light component in parallel with the first light component, and a projection lens to magnify and project the first and second light components outputted from the first modulating and outputting unit and the second modulating and outputting unit, respectively.

The foregoing and/or other aspects and advantages of the present general inventive concept may also be achieved by providing a projection method of a two-panel type projection system, the method including irradiating a polarized white light having Red/Green/Blue light components, sequentially selecting two light components among the Red/Green/Blue light components to output the selected light components every predetermined time, separating paths of the outputted two light components from each other, modulating a first light component among the path-separated light components adaptively to its corresponding image signal, using a first panel, modulating a second light component among the path-separated light components adaptively to its corresponding image signal, using a second panel, and magnifying and projecting the modulated first and second light components using a projection lens.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
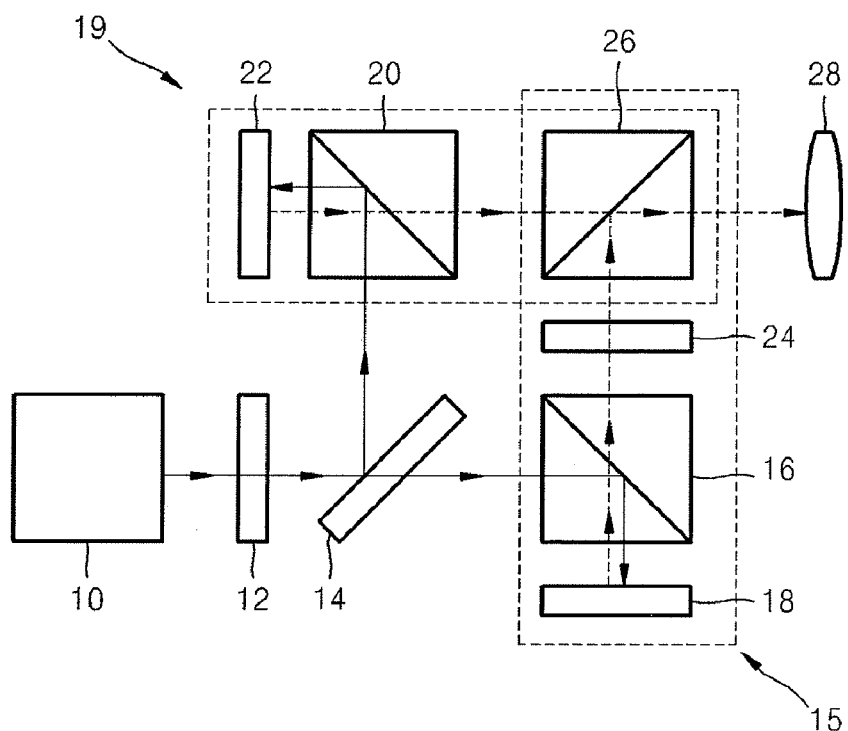
FIG. 1 is a view illustrating a two-panel type projection system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a view illustrating a two-panel type projection system according to an embodiment of the present general inventive concept.

As shown in FIG. 1, the two-panel type projection system includes a polarization light source 10, a color selector 12, a color path separator 14, a first modulating and outputting unit 15, a second modulating and outputting unit 19, and a projection lens 28.

The polarization light source 10 outputs a white light of a single polarization component. In this embodiment, the polarization light source 10 outputs an S-polarized light beam. The polarization light source 10 includes a lamp to irradiate a high-brightness white light, a Fly Eye Lens (FEL) to receive the irradiated light to convert the received light into a parallel light, and a polarization conversion unit to receive the parallel light from the FEL to convert the received parallel light into a specific polarization component.

The color selector 12 sequentially transmits two light components every predetermined time among red, green, and blue light components R, G, and B of the white light irradiated from the polarization light source 10.

The color selector 12 can be a rotatable dichroic wheel having color filters to reflect one of the red, green, blue light components R, G, and B and to allow remaining light components to be transmitted therethrough. The dichroic wheel has a color filter to reflect the red light component R and to transmit the green light component G and the blue light component B, a color filter to reflect the green light component G and transmit the red and blue light components R and B, and a color filter to reflect the blue light component B and transmit the red and green light components R and G. For example, in a case where the color selector 12 includes the dichroic wheel having the color filters which are arrayed at the same area, a first time for which the green and blue light components G and B are provided from the color selector 12, a second time for which the red and blue light components R and B are provided from the color selector 12, and a third time for which the red and green light components R and G is provided from the color selector 12 are the same as one another.

Further, the color selector 12 can also be a color switch, which is switched depending on an external signal to reflect one of the red, green, and blue light components R, G, and B and to allow the remaining light components to be transmitted through. In this case, a time ratio of the green and blue light components G and B, the red and blue light components R and B, and the red and green light components R and G of the color selector 12 can be controlled according to a control of the external signal.

The color path separator 14 operates in association with the color selector 12 to separate paths of two light components outputted from the color selector 12 and to output the separated two light components. For example, in a case where the color path separator 14 outputs the green and blue light components G and B, the green light component G can be outputted to the first modulating and outputting unit 15, and the blue light component B can be outputted to the second modulating and outputting unit 19.

The color path separator 14 can be a dichroic wheel having color filters to reflect one of the red, green, blue light components R, G, and B and to allow remaining light components to be transmitted therethrough. The dichroic wheel is inclined at a predetermined angle with respect to a light path of the light outputted from the color selector 12.

For example, when the color selector 12 outputs the green and blue light components G and B, the green light component G is reflected and the blue light component B is transmitted in a case where the color path separator 14 is configured to allow the output light to be incident on the color filter to reflect the green light component G of the color path separator 14. Since the color path separator 14 is inclined at the predetermined angle with respect to the output light of the color selector 12, the paths of a reflected light and a transmitted light can be suitably separated from each other.

Further, the color path separator 14 can be a color switch, which can be switched depending on the external signal to select a light component to be reflected. The color switch is also inclined at the predetermined angle with respect to the output light of the color selector 12.

In this case, a color to be reflected can be selected by controlling the external signal. If the color path separator 14 is inclined at the predetermined angle with respect to the output light of the color selector 12, the paths of the reflected light and the transmitted light can be separated from each other.

The first modulating and outputting unit 15 receives the first light component of the two light components from the color path separator 14 to modulate the received first light component depending on an image signal corresponding to the received first light component and then, output the modulated first light component.

The second modulating and outputting unit 19 receives the second light component from the color path separator 14 to modulate the received second light component depending on an image signal corresponding to the received second light component and then, output the modulated second light component in parallel with the modulated first light component.

The first modulating and outputting unit 15 and the second modulating and outputting unit 19 can be modified in construction.

As one example, the first modulating and outputting unit 15 includes a first panel 18 to modulate a first light component, a first polarization beam splitter 16 to reflect and guide the first light component to the first panel 18, and transmit the modulated first light component, a polarization conversion unit 24 to convert a polarization of the first light component outputted from the first polarization beam splitter 16, and a third polarization beam splitter 26 to reflect the output light component of the polarization conversion unit 24 and to allow the reflected light component to be incident on the projection lens 28. The second modulating and outputting unit 19 includes a second panel 22 to modulate a second light component, a second polarization beam splitter 20 to reflect and guide the second light component to the second panel 22, and to transmit the modulated second light component, and a third polarization beam splitter 26 to transmit the second light component outputted from the second polarization beam splitter 20 to input the transmitted second light to the projection lens 28.

Whether the polarization conversion unit 24 is positioned within the first modulating and outputting unit or within the second modulating and outputting unit as shown in the drawings can be, not absolutely, changed depending on whether the polarization beam splitters 16, 20, and 26 transmit or reflect any polarized light. In this embodiment, the S-polarized white light is irradiated from the polarization light source 10, and the dichroic film is coated on an interface such that the polarization beam splitters 16, 20, and 26 reflect the S-polarized light and transmit the P-polarized light.

The projection lens 28 magnifies and projects the light outputted from the first modulating and outputting unit 15 and the second modulating and outputting unit 19.

An operation of the present general inventive concept is described with reference to FIG. 1 and Table 1 as below.

TABLE 1

|  | Time duration 1 | | Time duration 2 | | Time duration 3 | |
| --- | --- | --- | --- | --- | --- | --- |
|  | Reflected light | Transmitted light | Reflected light | Transmitted light | Reflected light | Transmitted light |
| Color selector | R | G + B | B | R + G | G | R + B |
| Color path separator | B | G | R | G | R | B |
| First panel | G | | G | | B | |
| Second panel | B | | R | | R | |

Table 1 illustrates a color expressed by a panel at each time obtained by dividing one frame by 3, that is, a color modulated by the panel.

Time corresponding to one frame of an image signal is divided into the time duration 1 to the time duration 3. A sum-up time of the time durations 1 to 3 corresponds to the time corresponding to the one frame of the image signal. Each frame of the image signal is expressed by again repeating the above operation performed for the time durations 1 to 3.

If the S-polarized white light is irradiated into the color selector 12 from the polarization light source 10, the red light component reflects from the color selector 12 during the time duration 1. As a result, the green and blue light components G and B are transmitted through the color selector 12. The color path separator 14, which operates in association with the color selector 12, functions to reflect the Blue light component during the time duration 1. As a result, the green light component G is transmitted through the color path separator 14 to travel toward the first polarization beam splitter 16, and the blue light component B travels toward the second polarization beam splitter 20. Since the polarization beam splitters 16, 20, and 26 are configured to reflect the S-polarization, the incident green and blue light components G and B are reflected from the interface of the first and second polarization beam splitters 16 and 20 to be incident on the first panel 18 and the second panel 22, respectively.

The first panel 18 operates by the signal unit (not shown) to modulate and reflect the green light component G depending on the image signal corresponding to the incident green light component G. The second panel 22 operates by the signal unit (not shown) to modulate and reflect the blue light component B depending on the image signal corresponding to the incident blue light component B. At this time, the polarizations of the reflected green and blue light components are converted into the P-polarizations.

Since the modulated green light component G is the P-polarized light, the green light component G travels to transmit the interface of the first polarization beam splitter 16, and reaches the interface of the third polarization beam splitter 26. In the same way, since the modulated blue light component B is the P-polarized light, the blue light component B travels to transmit the interface of the second polarization beam splitter 20 and then reaches the interface of the third polarization beam splitter 26. The polarization conversion unit 24 converts the green light component G into the S-polarized light component to reflect the S-polarized green light component G from the interface of the third polarization beam splitter 26. Accordingly, the modulated green and blue light components G and B can be incident on the projection lens 28 in parallel with each other.

The operations of during the time durations 2 and 3 can be sufficiently understood from the above description with reference to Table 1. Accordingly, a detailed description thereof is omitted. For reference, as being appreciated in Table 1, the polarization conversion unit 24 converts the Green light component, which is modulated in the first panel 18 to be transmitted through the first polarization beam splitter 16, into the S-polarized light component during the time duration 2 in such a manner as during the time duration 1. And then, since the blue light component B is transmitted through the first polarization beam splitter 16 during the time duration 2, the polarization conversion unit 24 converts the blue light component B into the S-polarized light component.

As shown in Table 1, during the time duration 2, the green light component G is modulated in the first panel 18 and the red light component R is modulated in the second panel 22. To the contrary, in a case where the color path separator 14 is set differently, the red light component R can also travel to the first panel 18 and the green light component G can travel to the second panel 22.

In the above example, the time corresponding to one frame is divided into three time durations, but the time can be also divided into four or more time durations.

As being appreciated from Table 1, any one of the first panel 18 and the second panel 22 is not operated only for an expression of one color.

The present invention varies a ratio of between the time durations to adjust the color temperature. For example, when it is intended to reduce a light amount of the Blue light component and increase a light amount of the Red light component with a light amount of the Green light component being fixed, a boundary of the time duration 1 and the time duration 2 of Table 1 is drawn forth to reduce the time duration 1 and increase the time duration 2. Alternatively, when it is intended to fix the light amount of the Blue light component and increase the light amount of the Red light component, the time duration 2 is not changed with the time duration 1 being reduced and the time duration 2 being increased.

Figure 2:
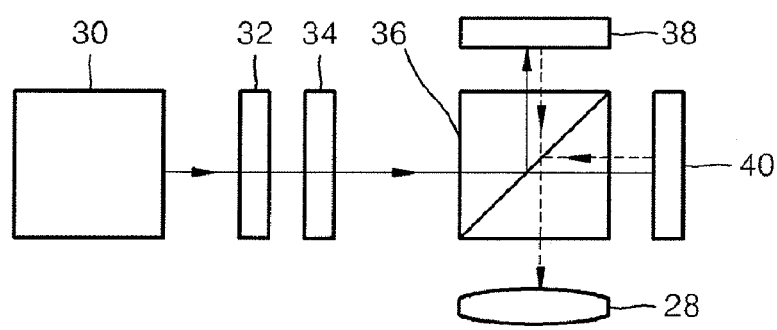
FIG. 2 is a schematic view illustrating a construction of a conventional two-panel type projection system.

In a conventional projection system of FIG. 2, a light amount of a red light component is always in a fixed state, a light amount of a green light component is increased and a light amount of blue light component is reduced, or only the contrary case can be performed. Therefore, the conventional projection system has a disadvantage in that the color distribution is not freely performed, thereby limiting the color temperature in control. Further, the conventional projection system has a disadvantage in that brightnesses of other colors are lowered due to a limited light amount of a color in a case where the color temperature is controlled referring to the white balance. However, the present general inventive concept has an advantage in that since the colors do not have the fixed light amounts and the light amounts of the colors can be controlled, the color temperature can be freely controlled. Further, the present general inventive concept has an advantage in that the brightness is not sacrificed for the control of the color temperature.

Alternatively, the projection method of the two-panel type projection system of FIG. 1 can be embodied as follows.

First, the polarized white light is irradiated. Among the red, green, and blue light components of the irradiated polarized white light, two light components are sequentially selected and outputted for a predetermined time. Next, paths of two light components selected and outputted are separated. The first light component of the two light components is modulated using the first panel adaptively to its corresponding image signal, and the second light component is modulated using the second panel adaptively to its corresponding image signal. Next, the modulated first and second light components are magnified and projected using the projection lens.

When it is intended to control the color temperature of the projected image, the projection method controls a ratio of a time for which each pair of the light components is outputted and a time corresponding to one frame.

As described above, since the two-panel type projection system and projection method can perform a desired color distribution to the first panel and the second panel, the free control of the color temperature can be achieved.

Further, since the free distribution of three colors can be achieved, the brightnesses of remaining colors are not required to be lowered adaptively to the color expressing the lowest brightness so as to maintain the white balance, thereby embodying the high brightness color.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A two-panel type projection system comprising:
   a polarization light source to irradiate a polarized white light;
   a color selector to sequentially transmit two light components every predetermined time period among a plurality of light components having different wavelengths of the white light;
   a color path separator to separate and output paths of the two light components outputted from the color selector;
   a first modulating and outputting unit to receive a first light component among the two light components outputted from the color path separator to modulate and output the received first light component depending on its corresponding portion of an image signal;
   a second modulating and outputting unit to receive a second light component among the two light components outputted from the color path selector to modulate the received second light component depending on its corresponding portion of the image signal and output the modulated second light component; and a projection lens to magnify and project the first and second light components outputted from the first modulating and outputting unit and the second modulating and outputting unit, respectively, wherein at least three light components are transmitted within a predetermined group of time periods, and the two light components transmitted during the predetermined time period are selected such that a same light component is not continuously transmitted within the predetermined group of time periods.

2. The system of claim 1, wherein the plurality of the light components comprises the first and second light components and a third light components, and the color selector is a dichroic wheel having color filters to reflect the third light component and transmit the first and second light components.

3. The system of claim 1, wherein the plurality of light components comprises the first and second light components and a third light component, and the color selector is a color switch, which is switched depending on an external signal to reflect the third light component and transmit the first and second light components.

4. The system of claim 1, wherein the plurality of light components comprises the first and second light components and a third light component, and the color path separator is a dichroic wheel having columnar-arrayed color filters to reflect the third light component and transmit the first and second light components, and is inclined at a predetermined angle with respect to a path of the first and second light components of the color selector.

5. The system of claim 1, wherein the plurality of light components comprises the first and second light components and a third light component, and the color path separator is a color switch, which is switched depending on an external signal to reflect the third light component and transmit the first and second light components, and is inclined at a predetermined angle with respect to a path of the first and second light components of the color selector.

6. The system of claim 1, wherein:
the first modulating and outputting unit comprises,
   a first panel to modulate the first light component;
   a first polarization beam splitter to reflect the first light component to guide the reflected first light component to the first panel, and to transmit the modulated first light component;
   a polarization conversion unit to convent polarization of the first light component outputted from the first polarization beam splitter; and
   a third polarization beam splitter to reflect the first light component of the polarization conversion unit to input the reflected first light component to the projection lens, and
the second modulating and outputting unit comprises,
   a second panel to modulate the second light component; and
   a second polarization beam splitter to reflect the second light component to guide the reflected second light component to the second panel, and to transmit the modulated second light component so that the third polarization beam splitter transmits the second light component outputted from the second polarization beam splitter to input the transmitted light component to the projection lens.

7. The system of claim 1, further comprising:
a color temperature controlling unit to control the color selector and the color path separator to vary a ratio of a time period for which each pair of the two light components among the plurality of light components are outputted, and a group of time periods corresponding to a frame of the image signal.

8. A projection method of a two-panel type projection system, the method comprising:
irradiating a polarized white light;
sequentially selecting two light components among a plurality of light components having different wavelengths of the white light to output the selected light components every predetermined time period;
separating paths of the outputted two light components from each other;
modulating a first light component among the path-separated light components adaptively to its corresponding portion of an image signal using a first panel;
modulating a second light component among the path-separated light components adaptively to its corresponding portion of the image signal using a second panel; and
magnifying and projecting the modulated first and second light components using a projection lens,
wherein at least three light components are transmitted within a predetermined group of predetermined time periods, and the two components transmitted during the predetermined time period are selected such that a same light component is not continuously transmitted within the predetermined group of time periods.

9. The method of claim 8, further comprising:
controlling a ratio of a time period for which each pair of the light components among the plurality of light components are outputted and a group of time periods corresponding to a frame of the image signal to control a color temperature.

10. A projection system comprising:
a polarization light source to irradiate a light having at least three light components;
a color selector to sequentially output at least three pairs of two light components from the at least three light components of the light such that no one light component is continually output through the sequence;
a color path separator to separate and output paths of the two light components outputted from the color selector;
a first modulating and outputting unit to receive a first light component of the two light components outputted from the color path separator to modulate and output the received first light component depending on its corresponding portion of an image signal;
a second modulating and outputting unit to receive a second light component of the two light components outputted from the color path selector to modulate the received second light component depending on its corresponding portion of the image signal and output the modulated second light component; and
a projection lens to magnify and project the first and second light components outputted from the first modulating and outputting unit and the second modulating and outputting unit, respectively, to form an image corresponding to the image signal,
wherein the first modulating and outputting unit comprises
   a first panel to modulate a the first light component, and
   a first polarization beam splitter to reflect the first light component to guide the reflected first light component to the first panel, and to transmit the modulated first light component, and the second modulating and outputting unit comprises
- a second panel to modulate a the second light component,
- a second polarization beam splitter to reflect the second light component to guide the reflected second light component to the second panel, and to transmit the modulated second light component, and
- a third polarization beam splitter to output the first light component and the second light component to the projection lens.

11. The system of claim 10, wherein the projection system comprises a two-panel type projection system.

12. The system of claim 10, wherein the projection system comprises a projection television or a projector.

13. The system of claim 10, wherein the at least three light components comprise red, green, and blue light components, and the at least three pairs of the two components comprise a first pair of the red and green light components, a second pair of the green and blue light components, and a third pair of the blue and red light components.

14. The system of claim 10, wherein the at least three pairs of the two components comprise a first pair, a second pair, and a third pair of the two light components among the at least three light components of the light, and the color selector outputs the first pair for a first time duration, the second pair for a second time duration, and the third pair for a third time duration.

15. The system of claim 14, wherein the first, second, and third time durations are different from one another.

16. A projection system, comprising:
- a light source to supply a polarized white light;
- a color selector to sequentially output two light components every predetermined time period among a plurality of light components having different wavelengths, and to output at least three light components over a group of time periods without continually outputting any one of the plurality of light components over the sequence;
- a separator to directly receive the two light components and to output the two light components along two different paths;
- a first modulating and outputting unit to receive the first light component outputted from the separator to modulate and output the received first light component depending on its corresponding portion of an image signal;
- a second modulating and outputting unit to receive the second light component outputted from the separator to modulate the received second light component depending on its corresponding portion of the image signal and output the modulated second light component; and
- a projection lens to magnify and project the first and second light components outputted from the first modulating and outputting unit and the second modulating and outputting unit, respectively.

* * * * *